Patented July 23, 1940

2,208,624

UNITED STATES PATENT OFFICE 2,208,624

CARBOXYLIC ACIDS OF CYCLIC KETONES AND PROCESS OF PRODUCING THEM

Willy Braun, Ludwigshafen-on-the-Rhine, Germany, assignor to General Aniline & Film Corporation, a corporation of Delaware No Drawing. Application February 11, 1939, Serial No. 255,875. In Germany February 15, 1938

10 Claims. (Cl. 260—352)

The present invention relates to carboxylic acids of cyclic ketones having at least 4 condensed nuclei and a process of producing same.

I have found that cyclic ketones having at least 4 condensed rings can be converted in an industrially simple manner into carboxylic acid chlorides or carboxylic acids by dissolving them in fused anhydrous aluminum chloride and causing phosgene to act on the solution.

It is preferable to add to the aluminum chloride salts which lower its melting point, as for example alkali or alkaline earth halides. Those high molecular compounds which are insoluble or scarcely soluble in the diluents usual in the Friedel-Crafts synthesis, may be reacted with phosgene with special advantage. As such initial materials there may be mentioned for example the phthalocyanines, as for example iron, cobalt, nickel and copper phthalocyanines and the metal-free phthalocyanines, and also indigo and its derivatives, the high molecular derivatives of anthraquinone, such as benzanthrones, anthraquinoneazines and -hydroazines, anthraquinoneacridones, azabenzanthrones, dibenzanthrones, isodibenzanthrones, anthranthrones, pyranthrones, allo-mesonaphthodianthrones, dibenzpyrenequinones and furthermore naphthindenones.

The simplest manner of carrying out the reaction is to dissolve the initial material in the aluminum chloride melt and to lead in phosgene while heating and stirring. Increased pressure may also be used.

Generally speaking the reaction proceeds satisfactorily at below 160° C. The acid chloride radicle may be introduced one or more times into the molecule depending on the initial material.

The final products may be separated either in the form of acid chlorides or in the form of the carboxylic acids appertaining thereto. They are usually obtained in a very pure state and in crystallized form; if necessary they may be further purified by the usual methods, as for example by recrystallization or by way of their salts or in many cases by treatment with hypochlorite. The yields often correspond to the calculated yields.

Some of the final products are dyestuffs and some may serve for the preparation of dyestuffs.

The following examples will further illustrate how the said invention may be carried out in practice but the invention is not restricted to these examples. The parts are by weight.

Example 1

A mixture of 100 parts of benzanthrone, 400 parts of anhydrous aluminum chloride and 48 parts of potassium fluoride is heated at 150° C. while stirring and a slow current of phosgene is led into this mixture for several hours at the said temperature. After working up in the usual manner a benzanthrone dicarboxylic acid is obtained which represents yellow crystals melting at 340° to 345° C. after recrystallization from quinoline, dissolving in concentrated sulphuric acid giving an orange coloration and a green fluorescence, and in dilute aqueous caustic alkali solutions giving a yellow coloration and a green fluorescence which coloration becomes brown upon addition of sodium hydrosulfite.

Example 2

70 parts of anthanthrone are introduced at 130° C. into a melt of 700 parts of anhydrous aluminum chloride, 70 parts of anhydrous calcium chloride, 60 parts of sodium chloride and 10 parts of potassium fluoride while stirring and phosgene is led into this melt at from 140° to 160° C. for some hours. After working up in the usual manner an anthanthrone monocarboxylic acid is obtained in form of orange colored crystals which dissolve in concentrated sulphuric acid giving a green coloration, and in dilute aqueous caustic alkali solution giving an orange coloration which changes to red upon addition of sodium hydrosulfite.

The potassium fluoride may be replaced by equal amounts of lithium iodide.

Example 3

90 parts of allo-meso-naphthodianthrone are introduced at 130° C. into a melt of 800 parts of anhydrous aluminum chloride, 120 parts of sodium chloride and 40 parts of rubidium chloride and a slow current of phosgene is led in at from 150° to 160° C. until a sample withdrawn is soluble in dilute aqueous caustic alkali solution without leaving a residue. After working up in the usual manner brown-yellow crystals are obtained which dissolve in concentrated sulphuric acid giving a red-violet coloration, and in dilute aqueous caustic alkali solutions giving a brown-yellow coloration which changes to blue-violet upon addition of sodium hydrosulfite.

Example 4

A slow current of phosgene is led at from 155° to 160° C. into a melt of 100 parts of 8-azabenzanthrone and 800 parts of anhydrous aluminum chloride for several hours while stirring. After working up in the usual manner a monocarboxylic acid of 8-azabenzanthrone is obtained in form of yellow crystals melting at from 240° to 243° C., dissolving in concentrated sulphuric acid giving a yellow coloration and a green fluorescence. The new compound dissolves in dilute aqueous caustic alkali solutions giving a yellow coloration which becomes orange after addition of sodium hydrosulfite.

Example 5

A mixture of 900 parts of anhydrous aluminum chloride, 90 parts of anhydrous magnesium chloride and 100 parts of N-dihydro-1,2,2',1'-anthraquinoneazine is melted and phosgene is led into this melt at from 150° to 160° C. for several hours. After working up in the usual manner a dark-blue colored compound is obtained which dissolves in concentrated sulphuric acid giving a brown-yellow coloration, and in dilute aqueous caustic alkali solutions giving a blue coloration which changes to violet after addition of sodium hydrosulfite.

Strontium chloride or barium chloride may be used instead of magnesium chloride.

Example 6

A slow current of phosgene is led at from 150° to 160° C. into a melt of 20 parts of indigo, 120 parts of anhydrous aluminum chloride, 20 parts of sodium bromide and 7 parts of potassium chloride for several hours while stirring. After working up an indigo dicarboxylic acid is obtained in form of blue-violet crystals which dissolve in concentrated sulphuric acid giving a blue-violet coloration, and in dilute aqueous caustic alkali solutions giving a blue coloration. The color of the vat is yellow.

Instead of the mixture of sodium bromide and potassium chloride sodium bromide can be used only.

Example 7

100 parts of 3,4,8,9-dibenzpyrene-5,10-quinone are introduced at 120° C. into a melt of 900 parts of anhydrous aluminum chloride and 133 parts of sodium chloride while stirring. The melt is then gradually heated to from 155° to 160° C. while introducing phosgene moderately until a sample withdrawn is soluble in dilute aqueous alkali hydroxide without leaving a residue. The melt is then worked up in the usual manner and an orange-yellow colored dicarboxylic acid is obtained which dissolves in concentrated sulphuric acid giving a violet-red, and in dilute aqueous caustic alkali solutions giving an orange coloration. The color of the vat is red.

Example 8

A mixture of 100 parts of isodibenzanthrone, 900 parts of anhydrous aluminum chloride, 135 parts of sodium chloride, 45 parts of potassium chloride and 20 parts of potassium fluoride is fused while stirring and phosgene is introduced at from 150° to 160° C. for several hours. After working up in the usual manner, a dark-blue colored carboxylic acid is obtained which dissolves in concentrated sulphuric acid giving a green coloration, and in dilute aqueous ammonia giving a blue coloration and a green fluorescence. The color of the vat is violet-blue.

If anthraquinone-2(N)1-benzacridone is employed instead of isodibenzanthrone a brown-yellow colored monocarboxylic acid of the anthraquinone-2(N)1-benzacridone is obtained which dissolves in concentrated sulphuric acid giving an orange coloration, and in dilute aqueous caustic alkali solutions giving a bluish-red coloration. The color of the vat is vivid red.

Example 9

20 parts of pyranthrone are introduced at 130° C. into a melt of 170 parts of anhydrous aluminum chloride and 26 parts of sodium chloride while stirring, and phosgene is led into the melt at from 155° to 160° C. for from 2 to 3 hours while stirring. After working up in the usual manner an orange colored pyranthrone dicarboxylic acid of a metallic green lustre is obtained in the calculated yield. It dissolves in concentrated sulphuric acid giving a blue-violet coloration, and in dilute aqueous caustic alkali solutions giving an orange coloration. The color of the vat is violet-red.

Example 10

A slow current of phosgene is introduced at from 155° to 160° C. into a melt of 180 parts of anhydrous aluminum chloride, 20 parts of potassium chloride, 10 parts of sodium bromide and 20 parts of Bz,1-bromobenzanthrone for several hours while stirring until a sample withdrawn is soluble in dilute aqueous caustic alkali hydroxide without leaving a residue. After working up in the usual manner a yellow colored Bz,1-bromobenzanthrone-monocarboxylic acid is obtained having a decomposition point of 300° C. after recrystallization from nitrobenzene. The new carboxylic acid dissolves in concentrated sulphuric acid giving a red-orange coloration, and in dilute aqueous caustic alkali hydroxide giving a yellow coloration. The color of the vat is golden-yellow.

If the Bz,1-bromobenzanthrone is replaced by Bz,1,Bz,1 - dibenzanthronylsulfide a carboxylic acid is obtained which dissolves in concentrated sulphuric acid giving an orange coloration and a green fluorescence, and in dilute aqueous caustic alkali solutions giving a red-brown coloration and a green fluorescence. The said carboxylic acid may be reprecipitated from its alkaline solution in yellow flakes by acidifying it with sulphuric acid.

Example 11

A current of phosgene is introduced at from 155° to 160° C. into a melt of 180 parts of anhydrous aluminum chloride, 30 parts of sodium bromide and 20 parts of 6,Bz,1-dibromobenzanthrone for from 3 to 4 hours while stirring. After working up in the usual manner a 6,Bz,1-dibromobenzanthrone - monocarboxylic acid is obtained in the calculated yield. It forms brownish-yellow crystals having the melting point of from 245° to 250° C. after recrystallization from nitrobenzene. The color of its solution in concentrated sulphuric acid is red and in dilute aqueous caustic alkali yellow with green fluorescence. The color of the vat is orange.

In a similar manner when starting from 6.7-dichlorobenzanthrone a monocarboxylic acid having similar properties is obtained.

Example 12

100 parts of 2-chloronaphthindenone are introduced at 120° C. into a melt of 600 parts of anhydrous aluminum chloride, and 120 parts of potassium chloride, and phosgene is led into this melt at from 155 to 160° C. for from 4 to 6 hours. The melt is worked up in the usual manner and the carboxylic acid thus obtained is purified by dissolving it in dilute aqueous sodium hydroxide and after filtration reprecipitating it by means of sulphuric acid. After recrystallization from nitrobenzene a 2-chloronaphthindenone monocarboxylic acid is obtained as a vivid yellow compound having the melting point of from 337° to 338° C. It dissolves in concentrated sulphuric acid giving a golden-yellow coloration, and in dilute aqueous caustic alkali solutions giving a yellow coloration and a green fluorescence. The color of the vat is golden-yellow. The melting point of the chloride of the said carboxylic acid is 200° to 203° C. after recrystallization from ortho-dichlorobenzene.

What I claim is:

1. A process of producing carboxylic acids of cyclic ketones having at least 4 condensed nuclei which comprises heating cyclic ketones having at least 4 condensed rings with phosgene in the presence of anhydrous aluminum chloride.

2. A process of producing carboxylic acids of cyclic ketones having at least 4 condensed nuclei which comprises heating cyclic ketones having at least 4 condensed rings with phosgene in the presence of anhydrous aluminum chloride and metal halides selected from the class consisting of alkali metal halides and alkaline earth halides.

3. A process of producing carboxylic acids of cyclic ketones having at least 4 condensed nuclei which comprises heating cyclic ketones having at least 4 condensed nuclei in a fused mixture of anhydrous aluminum chloride and metal halides selected from the class consisting of alkali metal halides and alkaline earth halides with phosgene.

4. A process of producing carboxylic acids of cyclic ketones having at least 4 condensed nuclei which comprises heating cyclic ketones having at least 4 condensed nuclei in a fused mixture of anhydrous aluminum chloride and alkali metal halides with phosgene.

5. A process of producing carboxylic acids of cyclic ketones having at least 4 condensed nuclei which comprises heating cyclic ketones having at least 4 condensed nuclei in a fused mixture of anhydrous aluminum chloride and alkali metal chlorides with phosgene.

6. A process of producing carboxylic acids of cyclic ketones having at least 4 condensed nuclei which comprises heating cyclic ketones having at least 4 condensed nuclei in a fused mixture of anhydrous aluminum chloride and sodium chloride with phosgene.

7. A benzanthrone carboxylic acid corresponding to the general formula

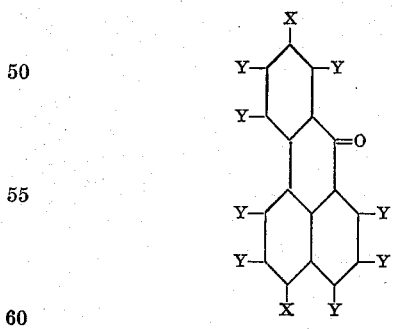

wherein the X's stand for a member selected from the group consisting of hydrogen and halogen atoms and at least one of the Y's for a carboxylic group, the other Y's being hydrogen, obtained by heating benzanthrones corresponding to the general formula

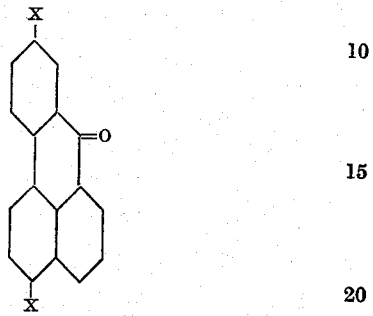

wherein the X's have the meaning mentioned above, in a fused mixture of aluminum chloride and an alkali metal halide at from 140° to 170 C. with phosgene.

8. A Bz1-bromo benzanthrone monocarboxylic acid obtained by heating Bz1-bromobenzanthrone in a fused mixture of aluminum chloride and an alkali metal halide at from 140° to 170° C. with phosgene, the said carboxylic acid having the decomposition point of 300° C. and being a yellow compound which dissolves in concentrated sulphuric acid giving a red orange coloration and in dilute caustic alkali solutions giving a yellow coloration and a green fluorescence.

9. A 6,Bz1-dibromobenzanthrone monocarboxylic acid obtained by heating 6,Bz1-dibromobenzanthrone in a fused mixture of aluminum chloride and an alkali metal halide at from 140° to 170° C. with phosgene the said carboxylic acid having the melting point of from 245° to 250° C. and being a yellow compound which dissolves in concentrated sulphuric acid giving a red coloration and in dilute caustic alkali solutions giving a yellow coloration and a green fluorescence.

10. A benzanthrone dicarboxylic acid obtained by heating benzanthrone in a fused mixture of aluminum chloride and an alkali metal halide at from 140° to 170° C. with phosgene, the said carboxylic acid having the melting point of from 340° to 345° C. and being a yellow compound which dissolves in concentrated sulphuric acid giving an orange coloration and a green fluorescence and in dilute caustic alkali solutions giving a yellow coloration and a green fluorescence.

WILLY BRAUN.